United States Patent [19]
Mays

[11] 3,791,412
[45] Feb. 12, 1974

[54] REDUCING VALVE FOR HIGH PRESSURE FLUIDS AND CONNECTING MEANS THEREFOR

[76] Inventor: Hal N. Mays, 23 Manor Veiw, Fairfax, Calif. 94930

[22] Filed: June 5, 1972

[21] Appl. No.: 259,438

[52] U.S. Cl.... 137/614.11, 137/505.29, 137/505.42, 137/512.5, 137/614.19
[51] Int. Cl.............................................. F16k 17/06
[58] Field of Search..... 137/505.12, 505.29, 505.34, 137/505.35, 505.42, 512, 512.5, 513, 614.11, 614.19

[56] References Cited
UNITED STATES PATENTS

| | | | |
|---|---|---|---|
| 2,868,224 | 1/1959 | Karlsson | 137/505.42 X |
| 3,113,432 | 12/1963 | Watson | 137/505.42 X |
| 1,367,361 | 2/1921 | Drake | 137/513 X |
| 2,649,115 | 8/1953 | Deardortt | 137/513 X |
| 2,245,485 | 6/1941 | Lewis | 137/505.42 X |
| 3,043,332 | 7/1962 | Henriques | 137/505.12 X |
| 2,831,756 | 4/1958 | Miles | 137/505.42 X |

FOREIGN PATENTS OR APPLICATIONS

| 69,315 | 9/1925 | Sweden | 137/505.42 |

*Primary Examiner*—Harold W. Weakley

[57] ABSTRACT

A pressure reducing assembly adapted to be connected to a source of high pressure fluid such as oxygen, including a fitting adapted to be secured to such source to provide a discharge means and a pressure controller secured to the fitting and provided with means for opening the fitting to the flow of high pressure fluid therethrough. The novel controller and fitting are sufficiently simple and inexpensive to manufacture that, when used with a high pressure oxygen cylinder for example, the entire assembly or the fitting may be economically discarded with the cylinder if the latter is not to be refilled. The high pressure fitting is provided with a valve which is adapted to be opened by the controller when low pressure throttled fluid is withdrawn from the latter.

6 Claims, 3 Drawing Figures

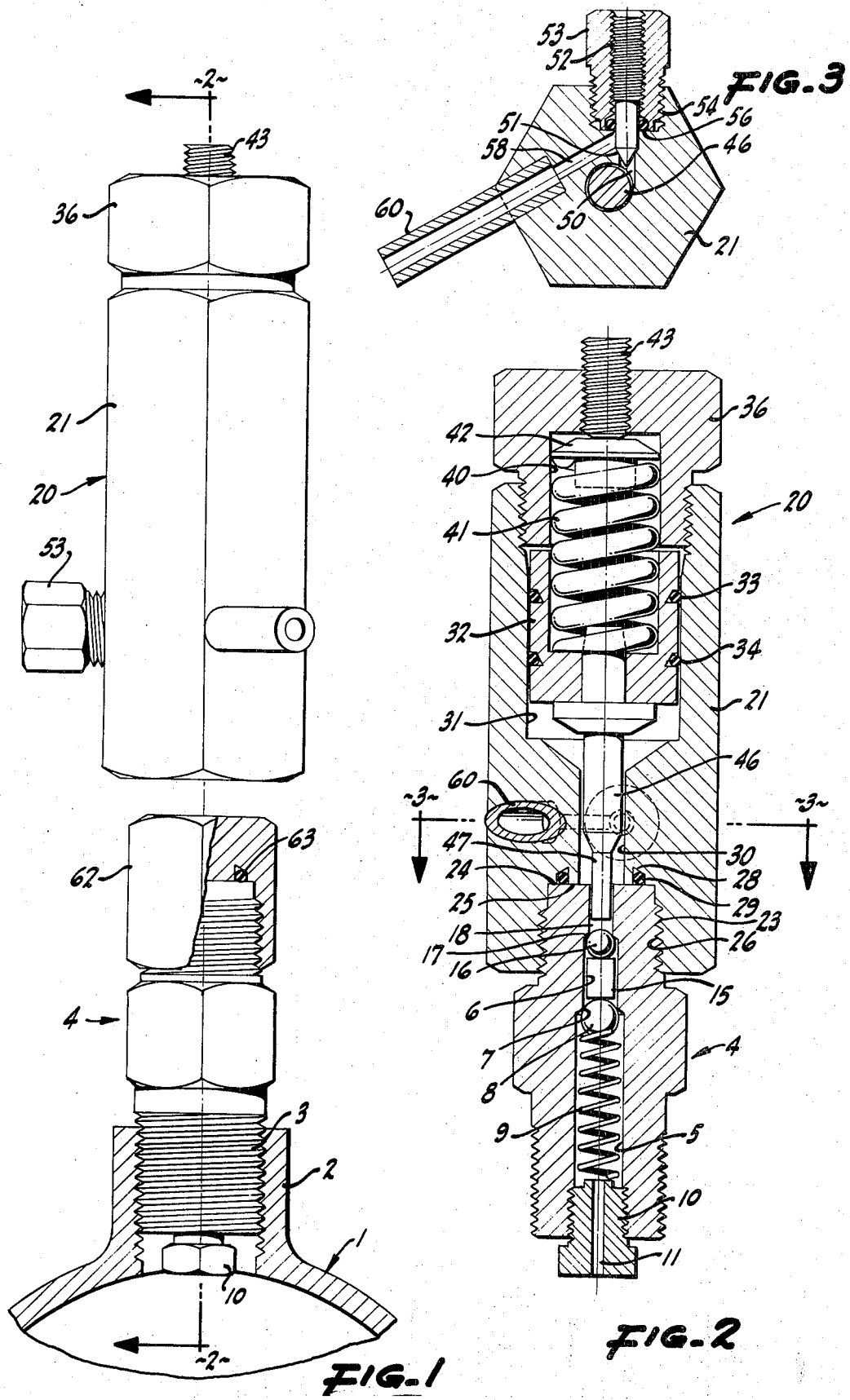

REDUCING VALVE FOR HIGH PRESSURE FLUIDS AND CONNECTING MEANS THEREFOR

This invention relates to a pressure reducing valve which is particularly adaptable for use with high pressure gas containers, such as, for example, oxygen flasks or cylinders.

The main object of the invention is the provision of a pressure reducer which is much simpler and cheaper to manufacture than pressure reducers of like nature found in the prior art.

Another object of the invention is the provision of an effective, inexpensive pressure regulator which may be employed with, for example, a high pressure oxygen container to permit the combination of the low pressure fluid discharged therefrom with a fuel such as acetylene, propane, and other fuels adapted for use in welding, soldering, brazing and the like. By the present invention, the cost of a welding or brazing kit may be reduced to the point at which the home shop craftsman can economically avail himself of such equipment.

Another object of the invention is the provision of an assembly comprising a pressure controller and a high pressure shut off fitting adapted to be received in the discharge neck of a high pressure container; the controller being designed to cooperate with the discharge fitting on the container to open the shut off valve in the latter when the regulator is set to discharge the fluid at any predetermined low pressure.

Still another object of the invention is the provision of a device which may be applied to oxyacetylene welding equipment and which is sufficiently precise in its pressure regulation as to satisfy the needs of the occasional, as distinguished from the professional, user, and at the same time is sufficiently rugged in construction and dependable in operation as to permit its reuse with different high pressure containers without dangerous hazard to the user.

Other objects and advantages will be apparent from the following specification and from the drawings.

FIG. 1 is an exploded view partly in section showing the high pressure gas container, the discharge fitting therefor, the temporary closure, and the controller which is adapted to fit on the discharge fitting upon removal of the temporary closure.

FIG. 2 is a sectional view of the discharge fitting and the regulator secured thereto in operating condition.

FIG. 3 is a horizontal cross section taken in a plane indicated by lines 3—3 of FIG. 1.

In detail, and first with reference to FIG. 1, the invention is adapted to be employed with a source of high pressure fluid such as a cylinder or flask generally designated 1 and having an internally threaded discharge neck 2 in which is threadedly secured one end of a discharge fitting generally designated 4. Fitting 4 is provided with a central bore 5 and a coaxial smaller bore 6. Between said bores a seat 7 is formed for receiving thereon a ball 8 which is urged at all times against said seat 7 by compression spring 9. The end of spring 9 opposite the ball 8 is received on a retainer 10 which is threadedly secured in the inlet end of bore 5 and provided with a central pasageway 11 through which the high pressure fluid from flask 1 communicates with bores 5, 6.

Within the smaller bore 6 and fitting 4, there is slidably received a cylindrical spacer 15, a few thousandths of an inch smaller in diameter, which spaces apart ball 8 and a second ball 16 which in turn is seated on a seat 17. Outwardly of seat 17 is a still smaller bore 18 through which the fluid passes to the pressure regulator or controller generally designated 20. As will be seen later on, the high pressure fluid in cylinder 1 is normally shut off by balls 8, 16 seated against their respective seats by the urgency of spring 9 and the very high pressure in bore 5. It will be understood that the length of spacer 15 must be accurately established to obtain seating of both balls at the same time. However, the very high pressure exerted on the ball seats causes any imperfection in the assembly to be molded out by the force applied, especially if balls 8, 16 and spacer 15 are made of very hard material such as hardened steel, and if the valve seats are made of relatively softer material, such as brass, or aluminum. The use of two balls provides a great amount of throttling within a limited space.

The pressure regulator 20 is preferably formed to provide an elongated body 21 of non circular cross section such as hexagonal, to facilitate tightening said body on the fitting 4 which is also preferably provided with a similar cross section to receive a wrench. The outer end of fitting 4 is provided with external threads 23 by which the regulator body 21 is releasably secured to said fitting as best seen in FIG. 2. The outer end of fitting 4 is formed with a flat surface 24 which, when the fitting 4 and pressure regulator 20 are assembled, abuts against the bottom 25 of the threaded recess 26 in which the fitting 4 is received. To provide an effective seal, the bottom 25 of regulator body 21 is formed with an angular groove 28 in which is received an O-ring 29 which effectively seals the joint against leakage.

In axial registration with outer bore 18 of fitting 4 is a somewhat larger bore 30 in body 21 coaxial with the central axis of the latter. This bore 30 provides a central passageway which terminates at its inner end in an enlarged cylinder 31 in which a piston 32 is slidably received. Leakage past piston 32 is prevented by O-rings 33, 34.

At the outer end of regulator body 21 the same is provided with an externally threaded head 36 secured in the outer end of cylinder 31.

Head 36 is provided with a central bore 40 in which is received a compression spring 41 which urges the piston 32 toward the fitting 4. The compression spring 41 is seated at its outer end on a retainer 42 which in turn is adjustably positioned by means of a screw 43 preferably provided with an internal socket to receive a wrench. At this point it will be noted that the force of spring 41 against piston 32 may be adjusted by turning screw 43.

The piston 32 is provided with an extension 46 which is preferably made of hardened material, such as steel, and press fitted gas tight with piston 32. This extension 46 extends into bore 30 and is a few thousandths of an inch smaller in diameter than bore 30 so that throttling action takes place in the annular space surrounding extension 46 and which space extends into cylinder 31. At its outer end, the extension 46 is reduced in diameter to provide a free end 47 which is slidably received with ample clearance within bore 18 of fitting 4. At this point it will be apparent that by adjusting the screw 43, the force of spring 41 may be made to open the valve formed by valve elements 8 and 16 when the movement of piston 32 is sufficient to engage the free end 47 of extension 46 with the ball 16. It will be noted that the annular spaces around balls 8 and 16, when the latter are open, also provide throttling of the high pressure gas as does the space between spacer 15 and its bore 6.

Intermediate the ends of bore 30 the same is intersected transversely by a discharge passageway 50 (see FIG. 3) into which the throttled fluid is discharged from the annular space between extension 46 and bore 30. The passageway 50 is enlarged to provide a seat 51 against which a needle valve 52 may be closed. Needle valve 52 comprises a screw threadedly secured within a plug 53 which in turn is threaded within a recess 54 in regulator body 21. Threads on screw 52 may extend only partly along its length so that the inner end of the screw is cylindrical and is sealed against an O-ring 56 as seated in the inner end of plug 53.

Communicating with the enlarged portion of discharge passageway 50 is another passageway 58 which serves as an outlet for the low pressure fluid and a suitable conduit 60 may be secured in body 21 as best seen in FIG. 3 to receive the discharged low pressure gas therethrough for connection to a welding torch or whatever other device is associated with it.

It will be noted that the pressure in cylinder 31 is substantially the same as that at the discharge passageway 50 and it would be possible to connect the inner end of cylinder 31 with the discharge. However, the configuration shown is preferable since the additional material of body 21 surrounding bore 30 provides a greater amount of room for the discharge structure shown in FIG. 3.

When it is desired to discharge low pressure fluid it is merely necessary to turn the screw 43 inwardly until the valve represented by balls 8, 16 is opened, allowing the high pressure fluid to enter bore 30 with the above noted throttling effects. It will be noted that the fluid pressure is brought to bear on the piston 32 against the force of the spring 41 causing outward movement of the piston 32 until the valve and fitting 4 closes.

Removal of the low pressure gas by opening needle valve 51 will result in a slight reduction of the pressure in cylinder 31 so that the valve in fitting 4 may again open. However, by adjusting screw 43 a state of equilibrium may be established wherein the balls 8 and 16 are moved off their respective seats sufficiently to deliver the desired quantity of fluid which, when throttled, acts on piston 32 to maintain the same in equilibrium relative to the unseated balls 8, 16.

When gas delivery is no longer required, it is merely necessary to close the needle valve 52 so that the device is in readiness for further use. If, on the other hand, the regulator 20 and fitting 4 are to be separated, the screw 43 may be retracted causing closure of the valve in fitting 4. Upon removal of the regulator 20 from fitting 4, a small quantity of low pressure fluid is trapped within the body 21 but as the two parts are unthreaded, the O-ring 29 separates from the outer face 24 of fitting 4 permitting such gas to escape along the threads 23.

A safety feature may be achieved by making the threads 23 long enough so that even if the operator fails to back off the screw 43, the unthreading of regulator 20 from fitting 4 causes the balls 8, 16 to seat before the threads 23 are completely disconnected.

It will be apparent that the coaxial arrangement of parts in the above described structure achieves an inexpensive, rugged and dependable pressure reducer assembly which can be made sufficiently inexpensive to permit the fitting 4 to be discarded with the cylinder 1 if desired.

Before the assembly of the regulator 20 with the fitting 4, the outer threads of the latter may be protected by means of a cap 62 (FIG. 1) during transit and handling. In such a case it is preferable to provide an O-ring seal 63 between the fitting 4 and the cap 62 in the event some leakage develops past the balls 8, 16.

As noted above, ample clearance is provided between extension 47 and bore 18 so that, at assembly, extension 47 is sure to enter bore 18 despite clearances provided in the threaded connection 23, 26. For this reason little thorttling, if any, takes place around extension 47. The throttling that takes place is therefore past balls 8, 16, past spacer 15, and past extension 46.

The use of two balls in fitting 4 is extremely important to the success of the present invention because a relatively large amount of throttling and an attendant great reduction in pressure takes place in a small space. Although the simultaneous seating and unseating of balls 8, 16 would appear to present difficulties from a machining point of view, in practice, the desired result may be achieved by careful measurement and by forcing the ball assembly against the seats by a relatively large force. As noted above, the use of relatively soft material such as brass and aluminum for the seats permits the desired result to be attained.

Together, the two balls 8, 16 and closely fit spacer 15 therebetween, approximate a single member of somewhat more complex shape that could also be used to provide the combined closure advantages of more than one seating surface, and the throttling advantages of several sharply defined apertures and annular spaces in series, axially between the high pressure source and the low pressure responsive element. The functional essence of this assembly is that during fluid flow through them, pressure reduction across the apertures is responsive to the position of the low pressure sensing element and pressure reduction through the unchanging annular space is responsive to flow rate through it. Consequently, precise control of a great overall pressure reduction is attained with a relatively small low pressure sensing element. Fluid flow rate to the appliance beyond the regulator is thus easily set and thereafter held constant without further adjustment of setscrew 43 or needle valve 52.

Whatever venting is required for the space in which spring 41 is received is provided by leakage past the threads of head 36 and the threads of screw 43.

I claim:

1. In a pressure reducing assembly, an inlet port, a pair of valve seats spaced apart axially in said port, a pair of valve elements respectively engageable with said seats simultaneously, spacing means interposed between said elements for spacing them apart a predetermined distance, the clearance between said spacing means and said port being sufficiently small to permit throttling past said means as well as past said elements when the latter are spaced from said seats.

2. A presssure reducing assembly according to claim 1 wherein said elements are balls and spring means is provided for urging said balls toward said seats at all times.

3. A pressure reducing assembly comprising:

a fitting adapted to be connected to a source of high pressure fluid and formed to provide a discharge port, a normally closed valve in said port, a pressure controller body secured to said fitting and formed with a passageway communicating at one of its ends with said port and formed at its opposite end to provide a cylinder, a piston slidably received in said cylinder, an extension secured at one end to said piston and extending into said passageway to define a space for low pressure throttled fluid between said extension and the walls of said passageway and with said space extending into said cylinder, the free end of said extension extending into said port, a low pressure outlet formed in said body and communicating with said space, resilient force applying means for urging said piston toward said one end and for engaging said free end with said valve for opening the latter, whereby the low pressure fluid in said space opposes the force of said force applying means on said piston to position said extension relative to said valve for controlling the flow therethrough, said port comprising a bore formed with a pair of first and second valve seats, a pair of first and second balls adapted to engage said first and second seats respectively, spring means engaging said second ball for urging said balls against said seats simultaneously, said free end of said extension being adapted to engage said first ball to unseat said first and second balls simultaneously against the urgency of said spring means.

4. An assembly according to claim 3 wherein a spacer is interposed between said balls.

5. An assembly according to claim 3 wherein said second ball is of substantially greater diameter than said first ball.

6. An assembly according to claim 4 wherein said spacer is cylindrical and of slightly less cross sectional extent than said bore to provide a small annular clearance space therebetween for effecting throttling past said spacer.

* * * * *